(12) United States Patent
Maekawa et al.

(10) Patent No.: US 9,305,340 B2
(45) Date of Patent: Apr. 5, 2016

(54) DRAWING DEVICE AND DRAWING PROGRAM

(75) Inventors: Takuya Maekawa, Tokyo (JP); Yusuke Yokosuka, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 110 days.

(21) Appl. No.: 14/240,532

(22) PCT Filed: Nov. 9, 2011

(86) PCT No.: PCT/JP2011/006269
§ 371 (c)(1),
(2), (4) Date: Feb. 24, 2014

(87) PCT Pub. No.: WO2013/069058
PCT Pub. Date: May 16, 2013

(65) Prior Publication Data
US 2014/0184635 A1    Jul. 3, 2014

(51) Int. Cl.
*G06T 11/60* (2006.01)
*G06T 11/20* (2006.01)
*G06T 5/00* (2006.01)
*G09G 5/28* (2006.01)
*G09G 5/20* (2006.01)
*G03F 3/04* (2006.01)
*G06K 9/22* (2006.01)
*G09G 5/22* (2006.01)

(52) U.S. Cl.
CPC .............. *G06T 5/003* (2013.01); *G06T 11/203* (2013.01); *G09G 5/227* (2013.01); *G09G 5/28* (2013.01); *G06T 2200/12* (2013.01); *G09G 2320/0252* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,581,680 A | * | 12/1996 | Sfarti et al. | 345/443 |
| 5,684,510 A | | 11/1997 | Brassell et al. | |
| 5,737,618 A | * | 4/1998 | Nakayama et al. | 345/649 |
| 5,842,147 A | * | 11/1998 | Nimura et al. | 701/443 |

(Continued)

FOREIGN PATENT DOCUMENTS

| | | |
|---|---|---|
| JP | 53 121424 | 10/1978 |
| JP | 2 995 | 1/1990 |

(Continued)

OTHER PUBLICATIONS

Office Action issued Mar. 17, 2015 in Japanese Patent Application No. 2013-542689 (with partial English language translation).

(Continued)

*Primary Examiner* — Wesner Sajous
(74) *Attorney, Agent, or Firm* — Oblon, McClelland, Maier & Neustadt, L.L.P.

(57) ABSTRACT

A reference point determinator determines, as a reference point, the center of each pixel where a sloped line is located. A candidate line generator generates candidate lines each connecting between a point in a pixel having the start point of the sloped line extracted by an endpoint extractor, and a point in a pixel having the end point of the sloped line. A candidate line selector selects a candidate line having the smallest sum total of distances between the candidate line and the reference points from the candidate lines generated by the candidate line generator. A data corrector corrects the sloped line to the candidate line selected by the candidate line selector.

7 Claims, 10 Drawing Sheets

(56) References Cited

U.S. PATENT DOCUMENTS

| | | |
|---|---|---|
| 2006/0221080 A1 | 10/2006 | Iwata et al. |
| 2009/0322759 A1 | 12/2009 | Nishikawa et al. |
| 2010/0039916 A1* | 2/2010 | Hasegawa et al. ............ 369/100 |
| 2010/0076640 A1* | 3/2010 | Maekawa et al. ................ 701/26 |

FOREIGN PATENT DOCUMENTS

| | | |
|---|---|---|
| JP | 5 323937 | 12/1993 |
| JP | 8 255254 | 10/1996 |
| JP | 9 305163 | 11/1997 |
| JP | 2000 137480 | 5/2000 |
| JP | 2006 284857 | 10/2006 |
| JP | 2009 204989 | 9/2009 |
| JP | 2010-9350 A | 1/2010 |

OTHER PUBLICATIONS

International Search Report Issued Feb. 14, 2012 in PCT/JP11/006269 Filed Nov. 9, 2011.

* cited by examiner

Division Point    Generation Of Straight Segment Lines

DRAWING DEVICE AND DRAWING PROGRAM

FIELD OF THE INVENTION

The present invention mainly relates to a drawing device and a drawing program that, when carrying out imaging of a scalable font drawn with a stroke, correct the position of a sloped line or a curved line, thereby reducing blots occurring in small characters and improving the visibility of characters.

BACKGROUND OF THE INVENTION

Conventional stroke font drawing is carried out by placing vector data on pixels and determining the brightness value of each of the pixels. In this case, in order to display smooth lines, antialiasing for setting up two or more levels of brightness values used as intermediate colors and drawing characters is used frequently. However, there is a case in which when drawing a low resolution font, such an intermediate color is recognized as a blot. To solve this problem, according to a conventional grid fitting method, by paying an attention to the vertical and horizontal segments (referred to as segments from here on) of a line segment, the segments are corrected to optimal positions on pixels to draw a sharp line segment. At the time of correcting the segments, the coordinates of the segments are selected in such a way that characters are not flattened due to an adjacency between the segments (for example, refer to patent reference 1).

RELATED ART DOCUMENT

Patent Reference

Patent reference 1: Japanese Unexamined Patent Application Publication No. Hei 8-255254

SUMMARY OF THE INVENTION

Problems to be Solved by the Invention

According to a conventional grid fitting method, blots regarding vertical lines and horizontal lines can be reduced and the visibility of characters can be improved. However, when drawing small sized characters actually used, blots are noticeable also in sloped lines and curved lines, and the occurrence of blots cannot be solved. A further problem is that according to a conventional grid fitting method, while the endpoints of a sloped line and a curved line are moved, the movement is not a correcting process of improving blots because the influence of the positions of the sloped line and the curved line are not taken into consideration.

The present invention is made in order to solve the problems, and it is therefore an object of the present invention to provide a drawing device that can reduce blots occurring in a sloped line and a curved line by correcting the positions of the sloped line and the curved line to optimal positions.

Means for Solving the Problem

In accordance with the present invention, there is provided a drawing device that carries out drawing by placing straight line data on pixels and determining a brightness value of each of the pixels according to a distance from the straight line data, the drawing device including: an endpoint extractor that extracts the pixel coordinates of a start point and an end point of a sloped line; a reference point determinator that determines, as reference points, centers of pixels where the sloped line is located; a candidate line generator that generates candidate lines each connecting between points located respectively within the pixels respectively having the start and end points extracted by the endpoint extractor; a candidate line selector that selects a candidate line having the smallest sum total of distances to the reference points from among the candidate lines generated by the candidate line generator; and a data corrector that corrects the sloped line to the candidate line selected by the candidate line selector.

Advantages of the Invention

The drawing device in accordance with the present invention compares candidate lines for a sloped line with reference points each of which is the central point on a pixel where the sloped line is located to select a candidate line having the smallest sum total of distances to the reference points, and corrects the sloped line to this candidate line. As a result, blots occurring in the sloped line can be reduced and the visibility of characters and so on can be improved.

EMBODIMENTS OF THE INVENTION

Hereafter, in order to explain this invention in greater detail, the preferred embodiments of the present invention will be described with reference to the accompanying drawings.

Embodiment 1

Figure 1:
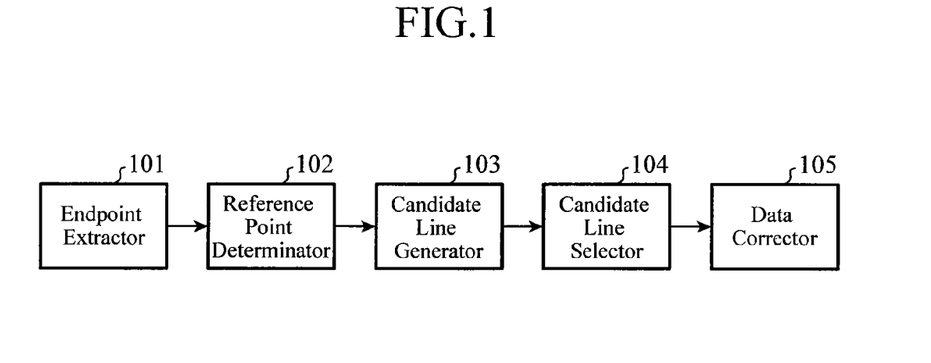
FIG. 1 is a functional block diagram showing a drawing device in accordance with Embodiment 1 of the present invention.

FIG. 1 is a functional block diagram of a drawing device in accordance with Embodiment 1. The drawing device in accordance with this embodiment includes an endpoint extractor 101, a reference point determinator 102, a candidate line generator 103, a candidate line selector 104, and a data corrector 105, as shown in the figure. The drawing device is implemented by a computer, and the endpoint extractor 101, the reference point determinator 102, the candidate line generator 103, the candidate line selector 104, and the data correctors 105 can consist of pieces of software corresponding to their functions and hardware, such as a CPU and a memory, which executes the software. As an alternative, at least one of the endpoint extractor 101, the reference point determinator 102, the candidate line generator 103, the candidate line selector 104, and the data correctors 105 can consist of hardware for exclusive use.

Figure 2:
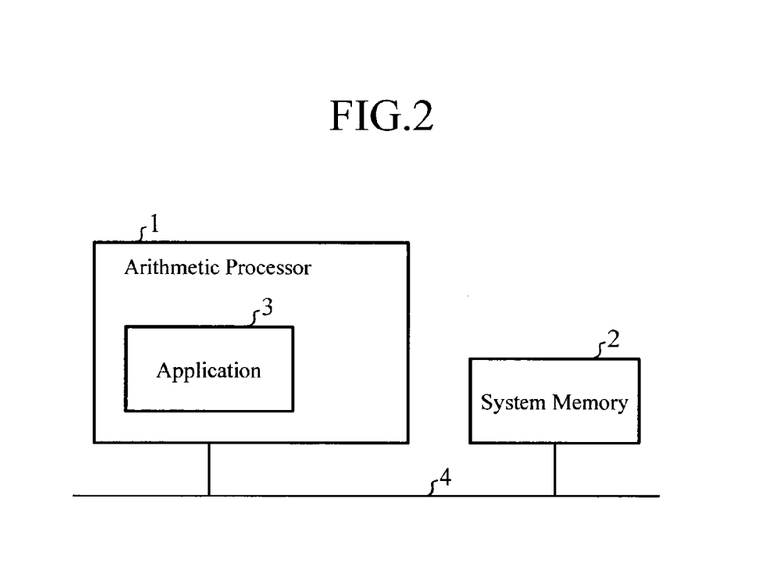
FIG. 2 is a block diagram of a computer system that implements a drawing device in accordance with the present invention.

FIG. 2 is a block diagram of a computer system that implements the drawing device. The computer system shown in this figure includes an arithmetic processor 1, a system memory 2, an application program 3, and a bus 4. The arithmetic processor 1 is represented by a CPU or the like. The system memory 2 is a storage that stores instruction codes and data of the arithmetic processor 1. The application program 3 is executed on the arithmetic processor 1, and includes programs for implementing the endpoint extractor 101, the reference point determinator 102, the candidate line generator 103, the candidate line selector 104, and the data correctors 105, which are mentioned above, respectively. This application program 3 analyzes font data copied to the memory, and carries out a corrected position calculating process in a process of carrying out imaging. The bus 4 is a system bus for connecting between the arithmetic processor 1 and the system memory 2.

The endpoint extractor 101 shown in FIG. 1 is a functional unit that extracts the pixel coordinates of the start point and the end point of a sloped line. The reference point determinator 102 is a functional unit that determines, as reference points, the centers of the pixels where the sloped line is located. The candidate line generator 103 is a functional unit that generates candidate straight lines each connecting between points in the pixels respectively having the start point and the end point extracted by the endpoint extractor 101. The candidate line selector 104 is a functional unit that selects a candidate line having the smallest sum total of distances to the reference points from among the candidate lines generated by the candidate line generator 103. The data corrector 105 is a functional unit that corrects the sloped line to the candidate line selected by the candidate line selector 104.

Figure 3:
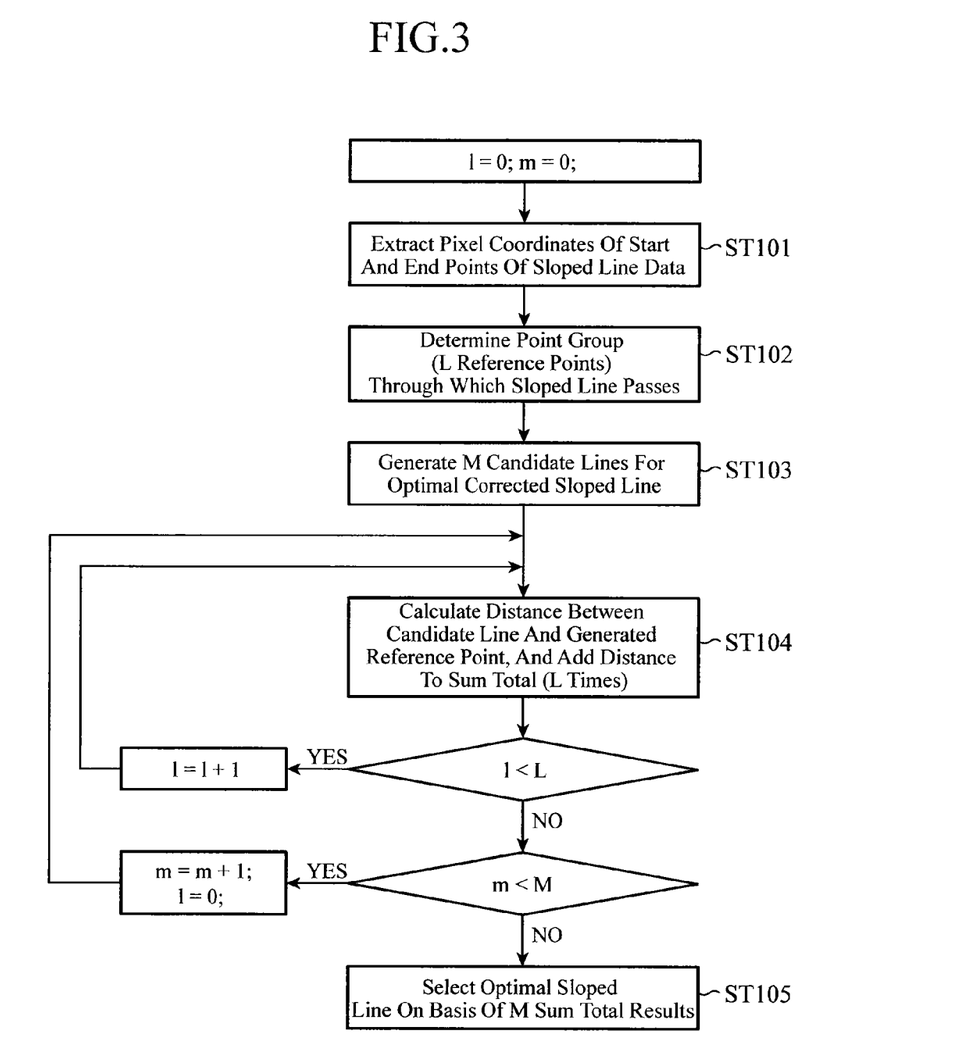
FIG. 3 is a flow chart showing an operating sequence of the drawing device in accordance with Embodiment 1 of the present invention.
Figure 4:
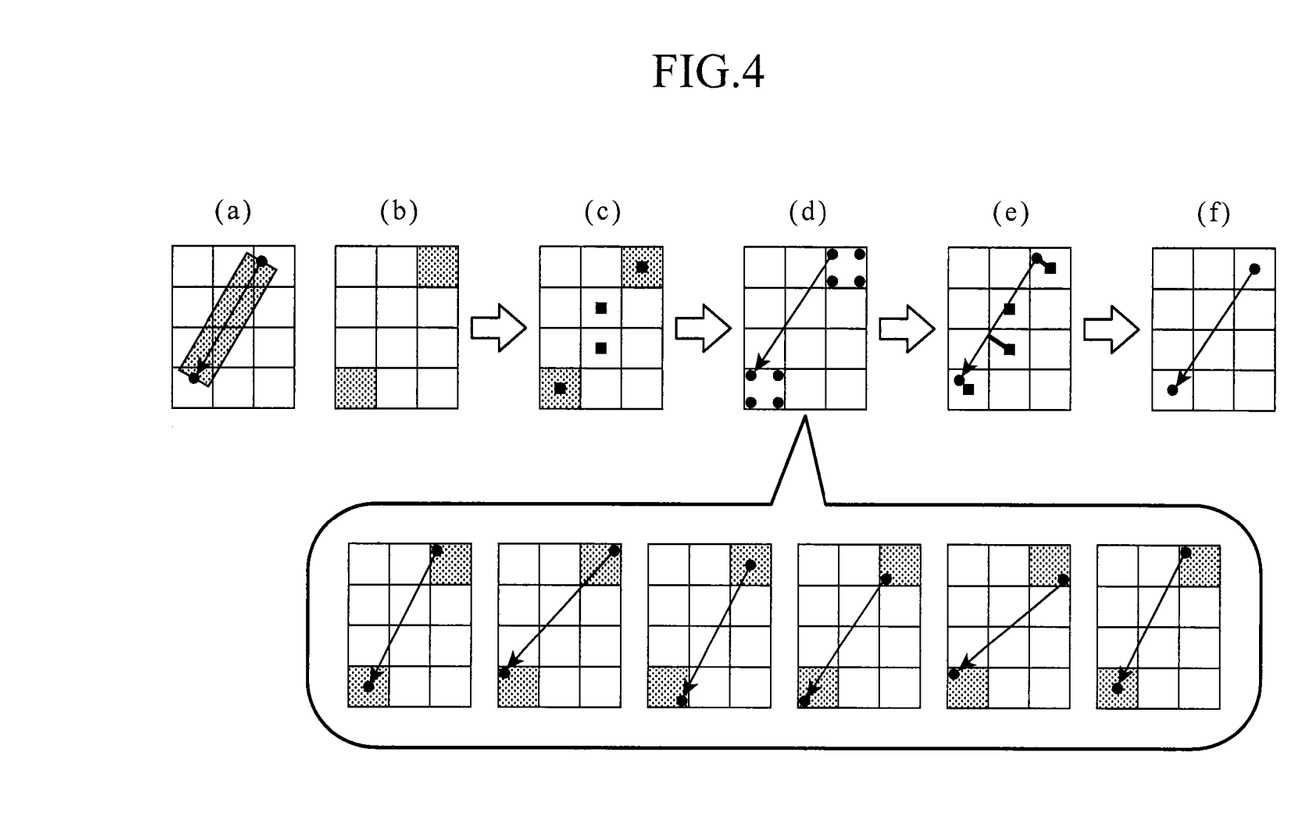
FIG. 4 is an explanatory drawing showing the results of processes corresponding to the operating sequence of the drawing device in accordance with Embodiment 1 of the present invention.

Next, the operation of the drawing device in accordance with Embodiment 1 will be explained. FIG. 3 is a flow chart showing an operating sequence of the drawing device. FIG. 4 is an explanatory drawing showing the results of processes corresponding to the operating sequence of the drawing device. First, the endpoint extractor 101 acquires data about a stroke from font data and acquires the coordinates of the start point and the end point of the sloped line. The endpoint extractor rounds off the coordinates to acquire the coordinates of the pixel where each of the points exists (step ST101). FIG. 4(a) shows the stroke data about the sloped line, and FIG. 4(b) shows the pixel coordinates extracted in step ST101.

Figure 5:
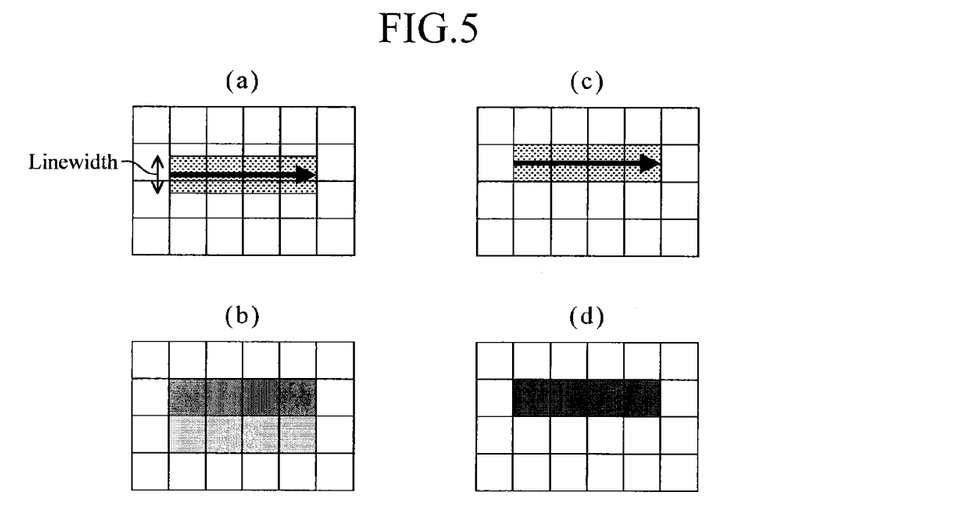
FIG. 5 is an explanatory drawing showing a relationship between stroke lines and rendering results.

Next, the reference point determinator 102 determines reference points which are used for the calculation of corrected positions (step ST102). The present invention is targeted mainly for a font having a low resolution. Small sized characters, such as characters having a 16-dot width, are expressed by lines having a 1-dot linewidth. At this time, when a line segment deviating from the centers of pixels is rendered, as shown in FIG. 5(a), a lightly colored line segment is drawn with a 2-dot linewidth (refer to FIG. 5(b)). In contrast, when a line segment passing through the centers of pixels is rendered, as shown in FIG. 5(c), a sharp line segment 1 having a 1-dot linewidth can be drawn (refer to FIG. 5(d)). More specifically, making a line segment pass through the centers of pixels makes it possible to draw a line segment which is the sharpest and has few blots. Therefore, also when drawing a sloped line, the start point and the end point of the sloped line are corrected in such a way that when making the sloped line pass through each pixel, the sloped line passes through a point close to the center of the pixel. In order to carry out this calculation, it is necessary to determine a group of points which are used as references through which the sloped line should pass. To this end, the Bresenham's algorithm typically used for line segment drawing is used. The Bresenham's algorithm is the one of drawing a straight line without decimal computations, thereby being able to carry out the drawing operation at a high speed.

The reference point determinator 102 receives, as an input, the pixel coordinates of the start point and the end point which are determined in step ST101, and calculates a group of pixel coordinates which constructs the line segment connecting between the start point and the end point. The reference point determinator defines these points including the start point and the end point as reference points. Because according to the Bresenham's algorithm, the larger one of the x and y components of the sloped line is defined as an axis and a point is generated for each pixel, the number of reference points depends upon the positions of the start point and the end point of the sloped line which are provided first. More specifically, the number of reference points L are determined by the larger one of the x and y components of the sloped line. For example, when the both end points of the sloped line are (0, 0) and (2, 3), as shown in FIG. 4(c), the y component of the sloped line is longer than the x component of the sloped line. Therefore, points at y=1 and y=2 are newly generated and the number of reference points is four in total. The reference points are determined this way, and the position of the sloped line is corrected in such a way that the distances between the sloped line and these reference points become short.

The candidate line generator 103 then generates M candidate lines for an optimal correction sloped line (step ST103). The candidate line generator determines the optimal position by calculating the distances from the reference points determined in step ST102 to each of these sloped lines. When correcting the position of the sloped line, the candidate line generator limits a correction range of each of the start and end points of the sloped line to the pixel where the point exists so as to prevent the balance of the character from being lost greatly. As shown in FIG. 4 (d), the candidate line generator selects an arbitrary point from the points within each of the pixels having one of the start and end points and connects between the arbitrary points to generate a plurality of sloped lines. The generated number M of sloped lines depends upon the accuracy of the correction, and is set up by a user. For example, the points are set up in steps of 0.1 of the pixel width within each of the pixels, so that 100 points are generated within each of the pixels. The candidate line generator connects between the points within each of the pixels to generate 10,000 sloped lines.

The candidate line selector 104 then calculates the distance between each of the M candidate lines generated in step ST103 and each of the reference points (step ST104). FIG. 4(e) illustrates a relationship in distance between a sloped line and the reference points. Because the plurality of reference points (L reference points) are provided for each of the sloped lines, the candidate line selector calculates the distance between the sloped line and each of all the reference points and calculates the sum total of distances. The candidate line selector calculates this sum total of distances for every of the sloped lines (the M sloped lines). The candidate line selector 104 then selects a sloped line having the smallest sum total on the basis of the M sum total results (step ST105), and the data corrector 105 corrects the position of the original sloped line to the position of the selected sloped line (refer to FIG. 4(f)).

Figure 6:
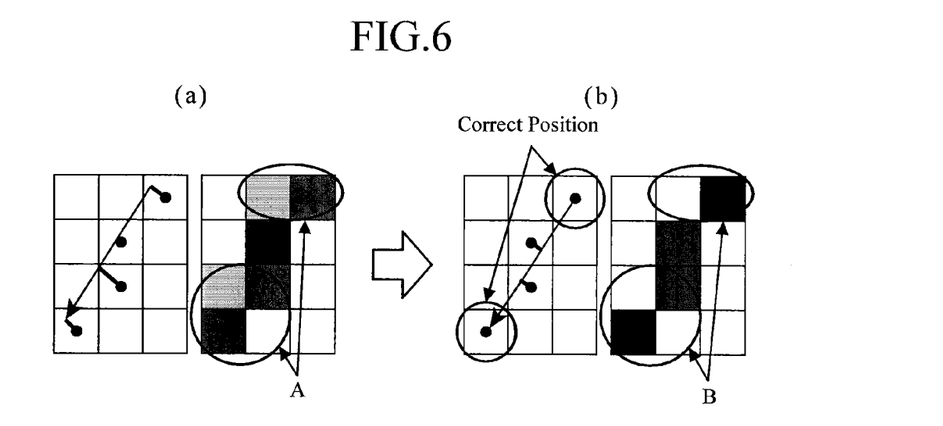
FIG. 6 is an explanatory drawing showing an example to which the drawing device in accordance with Embodiment 1 of the present invention is applied.
Figure 7:
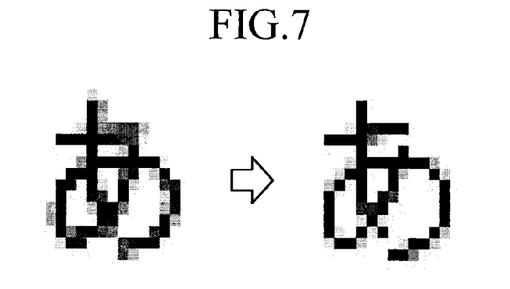
FIG. 7 is an explanatory drawing showing an example in which a drawing device in accordance with any one of Embodiments 1 to 4 of the present invention is applied to characters.

An example in which Embodiment 1 is applied to one sloped line is shown in FIG. 6, and FIG. 6(a) shows the result of rendering the sloped line before correction and FIG. 6(b) shows the result of rendering the corrected sloped line. While the brightness value is spread out and the line segment becomes blurred before the correction (in the figure, refer to arrows A), the line segment becomes sharp and blots are reduced after the correction (in the figure, refer to arrows B). Further, the result of applying this embodiment to a character "あ (a)" is shown in FIG. 7, and the first stroke of the character "あ (a)" is a sloped portion. By carrying out the correcting process of correcting the sloped line, the blurriness of the sloped portion is reduced As previously explained, because the drawing device in accordance with Embodiment 1, which carries out drawing by placing straight line data on pixels and determining the brightness value of each of the pixels, includes: the endpoint extractor that extracts the pixel coordinates of the start point and the end point of a sloped line; the reference point determinator that determines, as reference points, the centers of pixels where the sloped line is located; the candidate line generator that generates candidate lines each connecting between points respectively located within the pixels of the start and end points extracted by the endpoint extractor; the candidate line selector that selects a candidate line having the smallest sum total of distances to the reference points from among the candidate lines generated by the candidate line generator; and the data corrector that corrects the sloped line to the candidate line selected by the candidate line selector, blots occurring in the sloped line can be reduced and the visibility of characters and so on can be improved.

Further, because the drawing program in accordance with Embodiment 1 causes a computer that implements a drawing device that carries out drawing by placing straight line data on pixels and determining the brightness value of each of the pixels to function as: the endpoint extractor that extracts the pixel coordinates of the start point of a sloped line and the pixel coordinates of the end point of the sloped line; the reference point determinator that determines, as reference points, the centers of pixels where the sloped line is located; the candidate line generator that generates candidate lines each connecting between points respectively located within the pixels respectively having the start and end points extracted by the endpoint extractor; the candidate line selector that selects a candidate line having the smallest sum total of distances to the reference points from among the candidate lines generated by the candidate line generator; and the data corrector that corrects the sloped line to the candidate line selected by the candidate line selector, the drawing device that can reduce blots occurring in the sloped line and improve the visibility of characters and so on can be implemented on the computer.

Embodiment 2

A problem with the method of improving blots occurring in a sloped line in accordance with Embodiment 1 is that because the distances are calculated multiple times every time when a sloped line in a character is corrected, the amount of computations for the calculation is large. To solve this problem, in Embodiment 2, an example of improving blots by correcting each of the start and end points of a sloped line to the center of a pixel in order to achieve a speedup in a process of correcting the sloped line will be shown.

Figure 8:
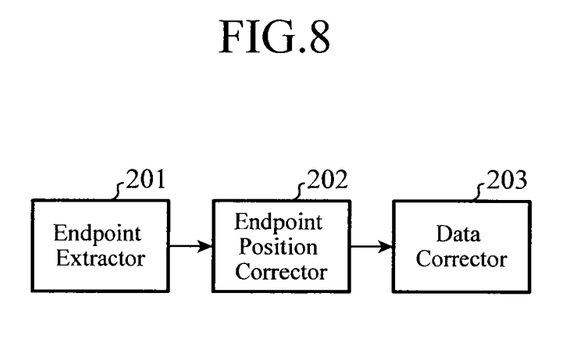
FIG. 8 is a functional block diagram showing a drawing device in accordance with Embodiment 2 of the present invention.

FIG. 8 is a functional block diagram showing a drawing device in accordance with Embodiment 1. The drawing device in accordance with Embodiment 2 includes an endpoint extractor 201, an endpoint position corrector 202, and a data corrector 203. The endpoint extractor 201 extracts the pixel coordinates of the start point and the end point of a sloped line, like the endpoint extractor 101 in accordance with Embodiment 1. The endpoint position corrector 202 corrects the position of each of the start and end points extracted by the endpoint extractor 201 to the center of a pixel. The data corrector 203 carries out the correction using a straight line segment connecting between the start point and the end point which are corrected by the endpoint position corrector 202 as data about the correction of the sloped line.

In accordance with Embodiment 2, because the position of each of the start and endpoints of the sloped line is corrected to the center of a pixel, it is guaranteed that blots are removed from the start point and the end point of the sloped line. Further, because when correcting a short sloped line, a corrected point of the sloped line which is determined in accordance with Embodiment 1 is placed at the center of a pixel in many cases, the correcting process of correcting each of the start and end points of a sloped line to the center of a pixel is effective. Because the process of correcting the coordinates of the sloped line to the center of a pixel is only a substitution of the position of a point, the time required to carry out the process can be reduced greatly.

As previously explained, because the drawing device in accordance with Embodiment 2, which carries out drawing by placing straight line data on pixels and determining the brightness value of each of the pixels, includes: the endpoint extractor that extracts the pixel coordinates of the start point and the end point of a sloped line; the endpoint position corrector that corrects the position of each of the start and end points extracted by the endpoint extractor to the centers of a pixel; and the data corrector that determines, as data about correction of the sloped line, a straight line segment connecting between the corrected start point and the corrected end point, the drawing device can reduce blots occurring in the sloped line and improve the visibility of characters and so on while being able to achieve a speedup in the process.

Embodiment 3

Figure 9:
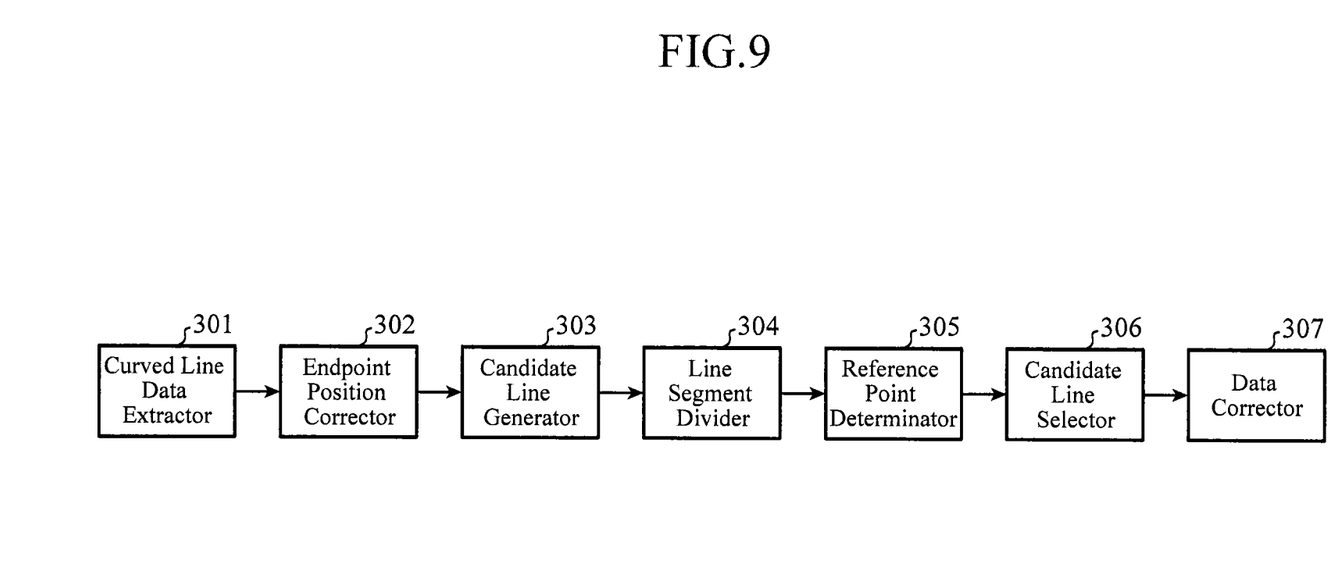
FIG. 9 is a functional block diagram showing a drawing device in accordance with Embodiment 3 of the present invention.

Embodiment 3 is an example, targeted for curved line data, of improving blots in the curved line data. FIG. 9 shows a functional block diagram of a drawing device in accordance with Embodiment 3. The drawing device in accordance with Embodiment 3 includes a curved line data extractor 301, an endpoint position corrector 302, a candidate line generator 303, a line segment divider 304, a reference point determinator 305, a candidate line selector 306, and a data corrector 307.

The curved line data extractor 301 is a functional unit that extracts the start point, the end point, and the control point of curved line data. The endpoint position corrector 302 is a functional unit that corrects the position of each of the start and end points extracted by the curved line data extractor 301 to the center of a pixel. The candidate line generator 303 is a functional unit that generates curved line candidate lines on the basis of the position of each of the start and end points, which is corrected by the endpoint position corrector 302, and a plurality of positions in the pixel having the control point. The line segment divider 304 is a functional unit that divides each of the candidate lines generated by the candidate line generator 303 into line segments. The reference point determinator 305 is a functional unit that determines the center of each pixel through which each of the straight line segments acquired through the division passes as a reference point. The candidate line selector 306 is a functional unit that selects a candidate line having the smallest sum total of distances between the straight line segments acquired through the division and the reference points, and distances between the tangents of the curved line at the division points and the centers of the pixels where the division points are located respectively. The data corrector 307 is a functional unit that corrects the curved line to the candidate line selected by the candidate line selector 306.

Also in Embodiment 3, the drawing device is implemented by a computer, and the endpoint extractor 301, the endpoint position corrector 302, the candidate line generator 303, the line segment divider 304, the reference point determinator 305, the candidate line selector 306, and the data corrector 307 can consist of pieces of software corresponding to their functions and hardware, such as a CPU and a memory, which executes the software. As an alternative, at least one of the functional units can consist of hardware for exclusive use.

Figure 10:
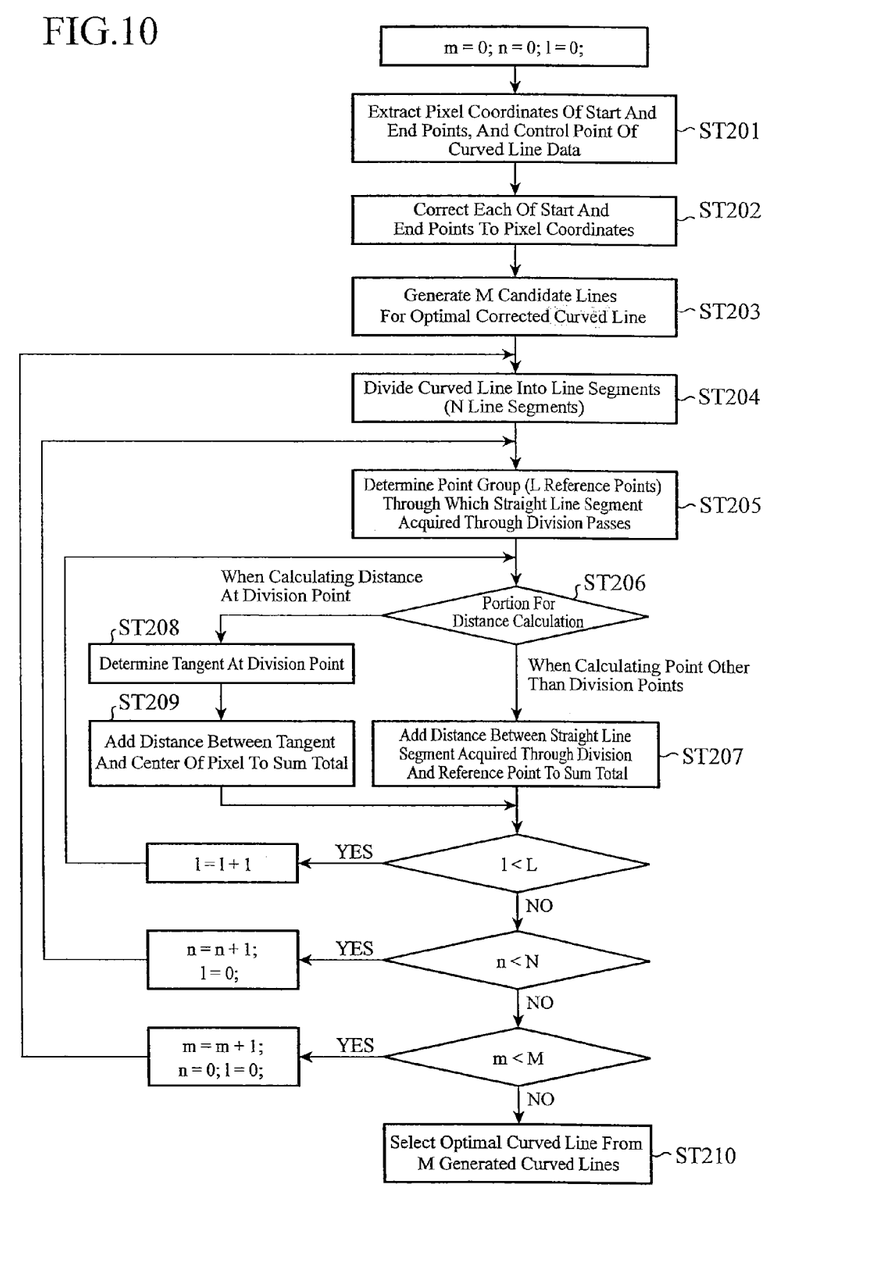
FIG. 10 is a flow chart showing an operating sequence of the drawing device in accordance with Embodiment 3 of the present invention.
Figure 11:
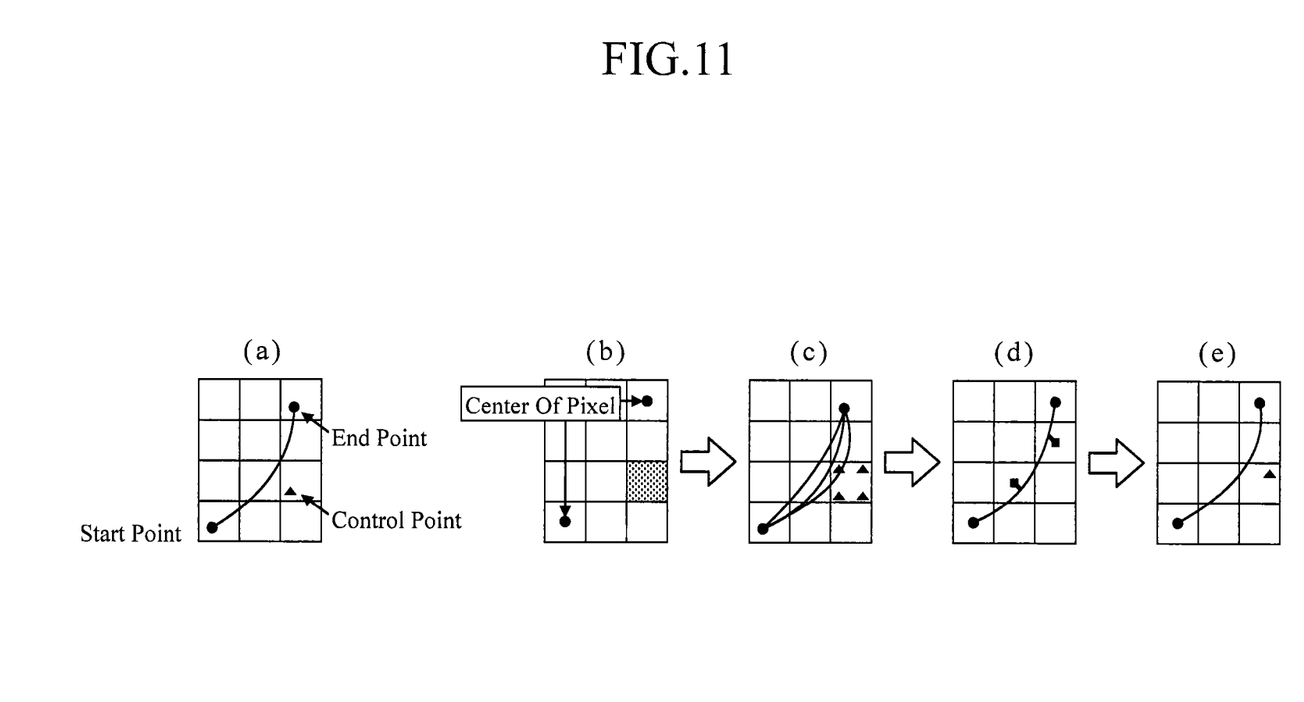
FIG. 11 is an explanatory drawing showing the results of processes corresponding to the operating sequence of the drawing device in accordance with Embodiment 3 of the present invention.

Next, the operation of the drawing device in accordance with Embodiment 3 will be explained. FIG. 10 is a flow chart showing an operating sequence of the drawing device in accordance with Embodiment 3. Curved line data which are handled in this embodiment is the one about a secondary spline curve, and a curved line consists of three points including a start point, an end point, and a control point, as shown in FIG. 11(a). A correction of a curved line is carried out in such a way that the sum total of distances from the centers of pixels through which the curved line passes to the curved line is minimized, in the case of a correction of a sloped line explained in Embodiments 1 and 2. First, the curved line data extractor 301 acquires curved line data from font data, and acquires the coordinates of the start point, the end point, and the control point of the curved line. The curved line data extractor rounds off those coordinates to acquire the pixel coordinates where each of the points exists (step ST201). The endpoint position corrector 302 then makes a correction to the start point and the end point (step ST202). The endpoint position corrector corrects each of the points to the center of a pixel (refer to FIG. 11(b)) by taking into consideration the consistency with a sloped line correction shown in Embodiment 2. As a result, there is also provided an advantage of reducing the amount of computations.

Next, the candidate line generator 303 generates a plurality of candidate lines (M candidate lines) for an optimal corrected curved line (step ST203). In this process, when correcting the position of the control point of the curved line, the candidate line generator limits a correction range of the control point of the curved line to the pixel where the control point exists so as to prevent the balance of the character from being lost greatly, like when correcting the position of a sloped line. As shown in FIG. 11(c), the candidate line generator changes the position of this control point and generates a plurality of curved lines which are curved differently. The generated number M of curved lines depends upon the accuracy of the correction, and is set up by a user. For example, the points are set up in steps of 0.1 of the pixel width within the pixel, so that 100 points are generated within the pixel. The candidate line generator then generates 100 curved lines.

Figure 12:
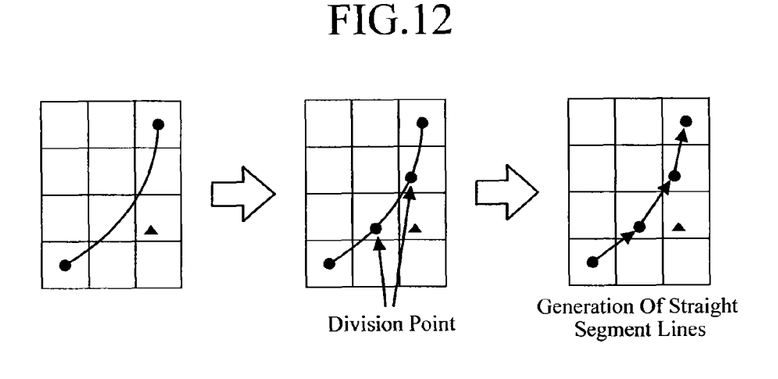
FIG. 12 is an explanatory drawing of a division into line segments by the drawing device in accordance with Embodiment 3 of the present invention.

The line segment divider 304 divides each of the curved lines generated in step ST203 into line segments in order to carry out a distance calculation (step ST204). When actually drawing a curved line, the curved line is divided into a plurality of straight line segments (N) and is drawn, as shown in FIG. 12. The number of divisions N is determined dependently upon the curvature of the curved line. The same distance calculation as that shown in Embodiment 1 is applied to each of the straight line segments acquired through the division (steps ST205 to ST207). More specifically, the distance to each reference point L is determined for all the generated M candidate lines and for all the N straight segment lines acquired through the division.

On the other hand, because each division point is a fulcrum of two lines having different direction vectors, a distance is calculated for each of the lines having the direction vectors and the calculation of the distance is carried out twice. In order to prevent this redundant calculation, no distance calculation is carried out at the time of calculating each of the straight line segments, and a distance calculation for each division point is carried out separately in steps ST208 and ST209. More specifically, when calculating a point other than the division points in a step of determining a distance calculation portion in step ST206, the drawing device advances to step ST207 and adds the distances between the straight line segments generated through the division and the reference points to the sum total of distances, and, when calculating the distance at each of the division points, carries out processes in steps ST208 to ST209. The process in step ST207 of calculating the distances between the straight line segments generated through the division and the reference points is the same as the process shown in Embodiment 1.

Figure 13:
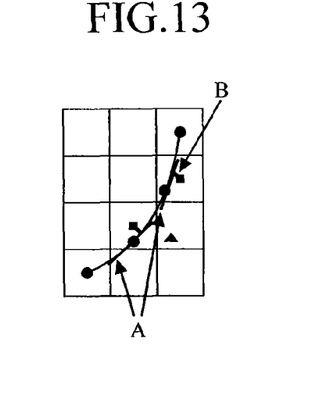
FIG. 13 is an explanatory drawing showing a process on division points by the drawing device in accordance with Embodiment 3 of the present invention.

The drawing device, in step ST208, calculates the tangent at each division point of the curved line because the division point is located on the curved line, as shown in FIG. 13 (in the figure, refer to arrows A). The drawing device then, in step ST209, calculates the distance between this tangent and the center of the pixel (in the figure, refer to an arrow B). The drawing device adds this value to determine the sum total of distances. The candidate line selector 306 determines the sum total of the distances of the plurality of straight line segments for each curved line to determine an evaluated value of the curved line (refer to FIG. 11(d)). The candidate line selector 306 carries out these calculations for all the generated curved lines. Finally, the candidate line selector 306 selects a curved line for which the calculated numerical value is a minimum (step ST210), and the data corrector 307 corrects the position of the control point extracted in step ST201 to the position of the control point of the selected curved line (refer to FIG. 11(e)). The drawing device corrects the position of the curved line by carrying out the above-mentioned operation. The result of actually applying this embodiment to a character "あ (a)" is shown in FIG. 7, and a lower portion of the character "あ (a)" consists of a curved line.

As previously explained, because the drawing device in accordance with Embodiment 3, which carries out drawing by placing curved line data on pixels and determining the brightness value of each of the pixels, includes: the curved line data extractor that extracts the pixel coordinates of the start point, the end point, and the control point of a curved line; the endpoint position corrector that corrects the position of each of the start and end points extracted by the curved line data extractor to the center of a pixel; the candidate line generator that generates candidate lines on the basis of both the positions of the start and end points which are corrected by the endpoint position corrector, and a plurality of positions in the pixel having the control point; the line segment divider that divides each of the candidate lines generated by the candidate line generator into straight line segments at division points; the reference point determinator that determines, as reference points, the centers of pixels through which the line segments generated through the division pass respectively; the candidate line selector that selects a candidate line having the smallest sum total of distances between the line segments generated through the division and the reference points and distances between the tangents of the curved line at the division points and the centers of the pixels where the division points are located from among the candidate lines; and the data corrector that corrects the curved line to the candidate line selected by the candidate line selector, blots occurring in the curved line can be reduced and the visibility of characters and so on can be improved.

Further, because the drawing program according to Embodiment 3 causes a computer, which implements a drawing device that carries out drawing by placing curved line data on pixels and determining the brightness value of each of the pixels, to function as: the curved line data extractor that extracts the pixel coordinates of the start point, the end point, and the control point of a curved line; the endpoint position corrector that corrects the position of each of the start and end points extracted by the curved line data extractor to the center of a pixel; the candidate line generator that generates candidate lines on the basis of both the positions of the start and end points which are corrected by the endpoint position corrector, and a plurality of positions in the pixel having the control point; the line segment divider that divides each of the candidate lines generated by the candidate line generator into straight line segments at division points; the reference point determinator that determines, as reference points, the centers of pixels through which the line segments generated through the division pass respectively; the candidate line selector that selects a candidate line having the smallest sum total of distances between the line segments generated through the division and the reference points and distances between the tangents of the curved line at the division points and the centers of the pixels where the division points are located from among the candidate lines; and the data corrector that corrects the curved line to the candidate line selected by the candidate line selector, the drawing device that can reduce blots occurring in the curved line and improve the visibility of characters and so on can be implemented on the computer.

Embodiment 4

Figure 14:
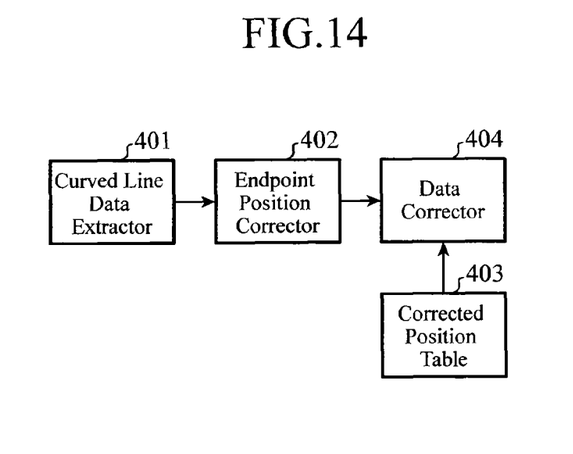
FIG. 14 is a functional block diagram showing a drawing device in accordance with Embodiment 4 of the present invention.

A problem with the method of improving blots occurring in a curved line which is executed in Embodiment 3 is that the amount of computations is large because the distance calculation is carried out multiple times. To solve this problem, in Embodiment 4, databasing is performed on corrected points for the control points of curved lines are in order to speed up a process of correcting a curved line. FIG. 14 shows a functional block diagram of a drawing device in accordance with Embodiment 4.

The drawing device in accordance with Embodiment 4 includes a curved line data extractor 401, an endpoint position corrector 402, a corrected position table 403, and a data corrector 404. The functions of the curved line data extractor 401 and the endpoint position corrector 402 are the same as those of the curved line data extractor 301 and the endpoint position corrector 302 in accordance with Embodiment 3. The corrected position table 403 is a database that indicates a corrected position of a control point when each of the positions of the start point and the end point of curved line data is corrected to the center of a pixel, and indicates a corrected position determined by the candidate line generator 303, the line segment divider 304, the reference point determinator 305, and the candidate line selector 306 in accordance with Embodiment 3.

Figure 15:
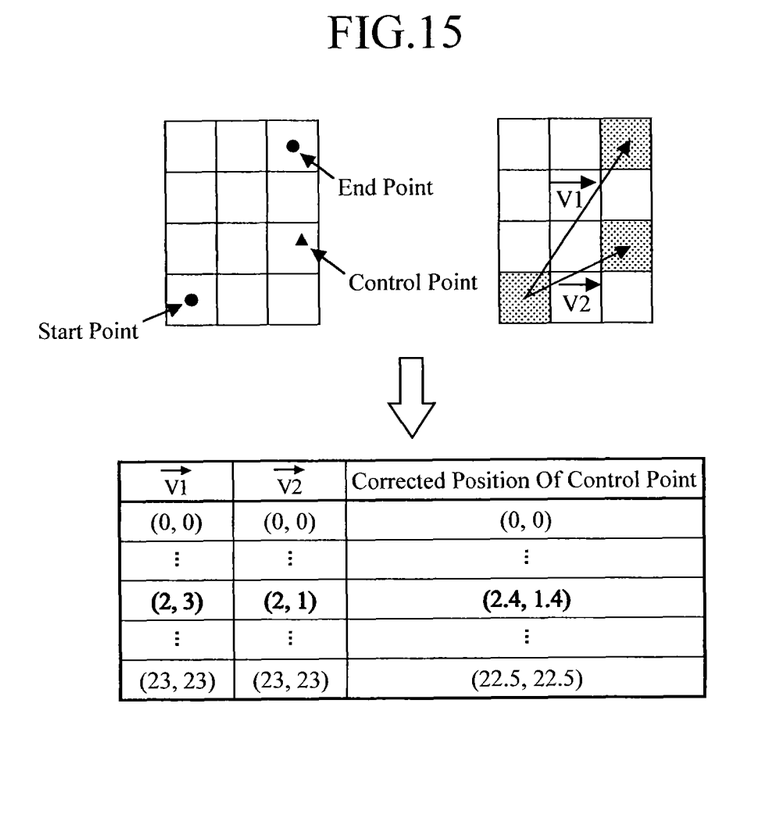
FIG. 15 is an explanatory drawing showing a corrected position table of the drawing device in accordance with Embodiment 4 of the present invention.

FIG. 15 is an explanatory drawing of the corrected position table 403. The corrected position table 403 holds data about two vectors: a vector connecting between the start point and the end point of a curved line and a vector connecting between the start point and the control point, and a corrected position of the control point at that time. When holding the vector data, the start point is fixed to the position (0, 0), and each of the vectors is defined in such a way as to be located on the x-axis and the y-axis, and in the first quadrant. Then, when the direction of a vector does not match any vector in the corrected position table 403, one or both of each data in the table is changed to be negative, and a matching vector is searched for and a corrected position is determined. As a result, the memory amount can be reduced. Further, data about this corrected position of the control point is determined by carrying out an off-line calculation as shown in the flow chart of FIG. 10 explained in Embodiment 3. When the control point is actually corrected, the real time nature of the process is improved by simply performing the process of referring to the corrected position table 403.

As previously explained, because the drawing device in accordance with Embodiment 4, which carries out drawing by placing curved line data on pixels and determining the brightness value of each of the pixels, includes: the curved line data extractor that extracts the start point, the end point, and the control point of a curved line; the endpoint position corrector that corrects each of the positions of the start and end points extracted by the curved line data extractor to the center of a pixel; the corrected position table indicating a corrected position of the control point when each of the positions of the start and end points of the curved line is corrected to the center of a pixel; and the data corrector that corrects the curved line on the basis of both the start and end points corrected by the endpoint position corrector, and the control point determined from the corrected position table, the drawing device can reduce blots occurring in the curved line and improve the visibility of characters and so on while being able to achieve a speedup in the process.

Further, because in the drawing device in accordance with Embodiment 4, the corrected position table indicates the position of the control point which corresponds to a candidate line determined by the candidate line generator, the line segment divider, the reference point determinator, and the candidate line selector in accordance with Embodiment 3, the position of the precise control point can be provided.

Although the above-mentioned embodiments are explained assuming that the present invention is targeted for characters, the present invention is not limited to this example, and can be applied similarly to images including sloped lines or curved lines.

In addition, while the invention has been described in its preferred embodiments, it is to be understood that an arbitrary combination of two or more of the embodiments can be made, various changes can be made in an arbitrary component in accordance with any one of the embodiments, and an arbitrary component in accordance with any one of the embodiments can be omitted within the scope of the invention.

INDUSTRIAL APPLICABILITY

As mentioned above, the drawing device and the drawing program in accordance with the present invention relate to a structure of placing vector data on pixels and determining the brightness value of each of the pixels, and are suitable for use in devices which carry out stroke font drawing.

EXPLANATIONS OF REFERENCE NUMERALS 101 and 201 endpoint extractor, 102 and 305 reference point determinator, 103 and 303 candidate line generator, 104 and 306 candidate line selector, 105, 203, 307, and 404 data corrector, 202, 302, and 402 endpoint position corrector, 301 and 401 curved line data extractor, 403 corrected position table.

The invention claimed is:

1. A drawing device that carries out drawing by placing straight line data on pixels and determining a brightness value of each of the pixels according to a distance from said straight line data, said drawing device comprising:
an endpoint extractor that extracts pixel coordinates of a start point and an end point of a sloped line;
a reference point determinator that determines, as reference points, centers of pixels where said sloped line is located;
a candidate line generator that generates candidate lines each connecting between points located respectively within the pixels respectively having the start and end points extracted by said endpoint extractor;
a candidate line selector that selects a candidate line having a smallest sum total of distances to said reference points from among the candidate lines generated by said candidate line generator; and
a data corrector that corrects said sloped line to the candidate line selected by said candidate line selector.

2. A drawing device that carries out drawing by placing straight line data on pixels and determining a brightness value of each of the pixels according to a distance from said straight line data, said drawing device comprising:
an endpoint extractor that extracts pixel coordinates of a start point and an end point of a sloped line;
an endpoint position corrector that corrects each of positions of the start and end points extracted by said endpoint extractor to a center of a pixel; and
a data corrector that determines, as data correcting said sloped line, a straight line connecting between said corrected start point and said corrected end point.

3. A drawing device that carries out drawing by placing curved line data on pixels and determining a brightness value of each of the pixels according to a distance from said curved line data, said drawing device comprising:
a curved line data extractor that extracts pixel coordinates of a start point, an end point, and a control point of a curved line;
an endpoint position corrector that corrects a position of each of the start and end points extracted by said curved line data extractor to a center of a pixel;
a candidate line generator that generates candidate lines on a basis of both the positions of the start and end points which are corrected by said endpoint position corrector, and a plurality of positions in a pixel having said control point;
a line segment divider that divides each of the candidate lines generated by said candidate line generator into line segments at division points;
a reference point determinator that determines, as reference points, centers of pixels through which said line segments generated through the division pass respectively;
a candidate line selector that selects a candidate line having a smallest sum of distances between said line segments generated through the division and said reference points and distances between tangents of the curved line at said division points and centers of pixels where said division points are located from among the candidate lines; and
a data corrector that corrects said curved line to the candidate line selected by said candidate line selector.

4. A drawing device that carries out drawing by placing curved line data on pixels and determining a brightness value of each of the pixels according to a distance from said curved line data, said drawing device comprising:
a curved line data extractor that extracts a start point, an end point, and a control point of a curved line;
an endpoint position corrector that corrects a position of each of the start and end points extracted by said curved line data extractor to a center of a pixel;
a corrected position table indicating a corrected position of the control point when the position of each of the start and end points of said curved line is corrected to a center of a pixel; and
a data corrector that corrects said curved line on a basis of both the start and end points corrected by said endpoint position corrector, and the control point determined from said corrected position table.

5. The drawing device according to claim 4, wherein said drawing device includes: a candidate line generator that generates candidate lines on a basis of both the positions of the start and end points which are corrected by said endpoint position corrector, and a plurality of positions in a pixel having said control point; a line segment divider that divides each of the candidate lines generated by said candidate line generator into line segments at division points; a reference point determinator that determines, as reference points, centers of pixels through which said line segments generated through the division pass respectively; and a candidate line selector that selects a candidate line having a smallest sum of distances between said line segments generated through the division and said reference points and distances between tangents of the curved line at said division points and centers of pixels where said division points are located from among the candidate lines, and said corrected position table indicates the position of the control point which corresponds to a candidate line selected by said candidate line selector.

6. A drawing program stored in a non-transitory computer readable storage medium that causes a computer that implements a drawing device that carries out drawing by placing straight line data on pixels and determining a brightness value of each of the pixels according to a distance from said straight line data to function as:
an endpoint extractor that extracts pixel coordinates of a start point and an end point of a sloped line;
a reference point determinator that determines, as reference points, centers of pixels where said sloped line is located;
a candidate line generator that generates candidate lines each connecting between points respectively located within the pixels respectively having the start and end points extracted by said endpoint extractor;

a candidate line selector that selects a candidate line having a smallest sum total of distances to said reference points from among the candidate lines generated by said candidate line generator; and a data corrector that corrects said sloped line to the candidate line selected by said candidate line selector.

7. A drawing program stored in a non-transitory computer readable storage medium that causes a computer that implements a drawing device that carries out drawing by placing curved line data on pixels and determining a brightness value of each of the pixels according to a distance from said curved line data to function as:

a curved line data extractor that extracts pixel coordinates of a start point, an end point, and a control point of a curved line;

an endpoint position corrector that corrects a position of each of the start and end points extracted by said curved line data extractor to a center of a pixel;

a candidate line generator that generates candidate lines on a basis of both the positions of the start and end points which are corrected by said endpoint position corrector, and a plurality of positions in a pixel having said control point;

a line segment divider that divides each of the candidate lines generated by said candidate line generator into line segments at division points;

a reference point determinator that determines, as reference points, centers of pixels through which the line segments generated through the division pass respectively;

a candidate line selector that selects a candidate line having a smallest sum of distances between said line segments generated through the division and said reference points and distances between tangents of the curved line at said division points and centers of pixels where said division points are located from among the candidate lines; and a data corrector that corrects said curved line to the candidate line selected by said candidate line selector.

* * * * *